(12) United States Patent
Zhou et al.

(10) Patent No.: US 11,500,139 B2
(45) Date of Patent: *Nov. 15, 2022

(54) WAVELENGTH BEAM COMBINING LASER SYSTEMS UTILIZING PRISMS FOR BEAM QUALITY IMPROVEMENT AND BANDWIDTH REDUCTION

(71) Applicants: Wang-Long Zhou, Andover, MA (US); Bien Chann, Merrimack, NH (US); Daniel Gary Dugmore, North Reading, MA (US); Mike Cruz, Somerville, MA (US)

(72) Inventors: Wang-Long Zhou, Andover, MA (US); Bien Chann, Merrimack, NH (US); Daniel Gary Dugmore, North Reading, MA (US); Mike Cruz, Somerville, MA (US)

(73) Assignee: TERADIODE, INC., Wilmington, MA (US)

( * ) Notice: Subject to any disclaimer, the term of this patent is extended or adjusted under 35 U.S.C. 154(b) by 308 days.

This patent is subject to a terminal disclaimer.

(21) Appl. No.: 16/850,159

(22) Filed: Apr. 16, 2020

(65) Prior Publication Data
US 2020/0310010 A1 Oct. 1, 2020

Related U.S. Application Data

(63) Continuation of application No. 16/295,016, filed on Mar. 7, 2019, now Pat. No. 10,656,429, which is a
(Continued)

(51) Int. Cl.
*G02B 27/10* (2006.01)
*G02B 5/18* (2006.01)
(Continued)

(52) U.S. Cl.
CPC ............ *G02B 5/1814* (2013.01); *G02B 3/06* (2013.01); *G02B 5/04* (2013.01); *G02B 5/18* (2013.01); *G02B 23/00* (2013.01); *G02B 27/0972* (2013.01); *G02B 27/1006* (2013.01); *G02B 27/1086* (2013.01); *G02B 27/141* (2013.01); *G02B 2005/1804* (2013.01)

(58) Field of Classification Search
CPC .......... G02B 27/141; G02B 3/06; G02B 5/04; G02B 5/18; G02B 5/1814; G02B 23/00; G02B 2005/18; G02B 27/0972; G02B 27/1006; G02B 27/1086; G02B 2005/1804
USPC ......................................................... 359/566
See application file for complete search history.

(56) References Cited

U.S. PATENT DOCUMENTS 6,731,838 B1    5/2004  Dueck et al.
8,559,107 B2   10/2013  Chann et al.
(Continued)

OTHER PUBLICATIONS

International Search Report and Written Opinion, International Application No. PCT/US2017/014108, dated Apr. 18, 2017, 11 pages.

*Primary Examiner* — Wen Huang
(74) *Attorney, Agent, or Firm* — Morgan, Lewis & Bockius LLP

(57) ABSTRACT

In various embodiments, one or more prisms are utilized in a wavelength beam combining laser system to regulate beam size and/or to provide narrower wavelength bandwidth.

20 Claims, 6 Drawing Sheets

Related U.S. Application Data continuation of application No. 15/410,277, filed on Jan. 19, 2017, now Pat. No. 10,268,043.

(60) Provisional application No. 62/280,964, filed on Jan. 20, 2016.

(51) Int. Cl.
*G02B 5/04* (2006.01)
*G02B 23/00* (2006.01)
*G02B 27/14* (2006.01)
*G02B 27/09* (2006.01)
*G02B 3/06* (2006.01)

(56) References Cited

U.S. PATENT DOCUMENTS

| | | |
|---|---|---|
| 10,268,043 B2 | 4/2019 | Zhou et al. |
| 10,656,429 B2 | 5/2020 | Zhou et al. |
| 2002/0126385 A1 | 9/2002 | Asami et al. |
| 2003/0099433 A1 | 5/2003 | Wong et al. |
| 2009/0022184 A1 | 1/2009 | Ito et al. |
| 2011/0216792 A1* | 9/2011 | Chann .................... H01S 5/405 372/31 |
| 2011/0310921 A1 | 12/2011 | Chann et al. |
| 2012/0219252 A1 | 8/2012 | Marom |
| 2014/0240831 A1* | 8/2014 | Chann ................ G02B 27/1006 359/489.08 |
| 2015/0009508 A1 | 1/2015 | Bachmann et al. |
| 2015/0364900 A1 | 12/2015 | Chann et al. |
| 2017/0205632 A1 | 7/2017 | Zhou et al. |
| 2019/0265491 A1 | 8/2019 | Zhou et al. |

\* cited by examiner

WAVELENGTH BEAM COMBINING LASER SYSTEMS UTILIZING PRISMS FOR BEAM QUALITY IMPROVEMENT AND BANDWIDTH REDUCTION

This application is a continuation of U.S. patent application Ser. No. 16/295,016, filed Mar. 7, 2019, which is a continuation of U.S. patent application Ser. No. 15/410,277, filed Jan. 19, 2017, which claims the benefit of and priority to U.S. Provisional Patent Application No. 62/280,964, filed Jan. 20, 2016, the entire disclosure of each of which is hereby incorporated herein by reference.

RELATED APPLICATION

This application claims the benefit of and priority to U.S. Provisional Patent Application No. 62/280,964, filed Jan. 20, 2016, the entire disclosure of which is hereby incorporated herein by reference.

TECHNICAL FIELD

In various embodiments, the present invention relates to laser systems, particularly wavelength beam combining laser systems having improved beam quality and narrowed wavelength bandwidth.

BACKGROUND

High-power laser systems are utilized for a host of different applications, such as welding, cutting, drilling, and materials processing. Such laser systems typically include a laser emitter, the laser light from which is coupled into an optical fiber (or simply a "fiber"), and an optical system that focuses the laser light from the fiber onto the workpiece to be processed. The optical system is typically engineered to produce the highest-quality laser beam, or, equivalently, the beam with the lowest beam parameter product (BPP). The BPP is the product of the laser beam's divergence angle (half-angle) and the radius of the beam at its narrowest point (i.e., the beam waist, the minimum spot size). The BPP quantifies the quality of the laser beam and how well it can be focused to a small spot, and is typically expressed in units of millimeter-milliradians (mm-mrad). A Gaussian beam has the lowest possible BPP, given by the wavelength of the laser light divided by pi. The ratio of the BPP of an actual beam to that of an ideal Gaussian beam at the same wavelength is denoted $M^2$, or the "beam quality factor," which is a wavelength-independent measure of beam quality, with the "best" quality corresponding to the "lowest" beam quality factor of 1.

Wavelength beam combining (WBC) is a technique for scaling the output power and brightness from laser diode bars, stacks of diode bars, or other lasers arranged in one- or two-dimensional array. WBC methods have been developed that combine beams along one or both dimensions of an array of emitters. Typical WBC systems include multiple emitters, such as one or more diode bars, that are combined using a dispersive element (e.g., a diffraction grating) to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein.

Ideally, a WBC laser system with a diffractive grating combines multiple emitters at different wavelengths individually defined by the grating into a single output beam of multiple wavelengths with a beam quality comparable to single emitter. However, in practice, the beam quality of the combined output beam may be significantly worse than that of a single emitter. One major reason is that different beams from different emitters have different incident angles on the grating, which causes different projected beam sizes on the grating. In such cases, the beams may not overlap each other completely on and optically downstream of the grating. The different angles of incidence may also result in severe dislocations of waists of diffracted beams and therefore reduce feedback uniformity and WBC resonator efficiency.

In addition, since a WBC system requires different emitters operating at different wavelengths, the available wavelength bandwidth of the source array may be a critical resource. In many cases, this bandwidth sets the requirement for dispersion power of the grating and defines the maximum number of combinable emitters or the minimum size of a WBC resonator. Reduction in the usage of wavelength bandwidth is equivalent to increasing dispersion power, and also may help improve laser performance, such as faster cold-start, higher efficiency, etc.

SUMMARY

In various embodiments, the present invention improves beam quality of WBC laser systems by using one or more prisms in the WBC resonator. Embodiments of the present invention may include one or more emitters (or "beam emitters") each emitting one or more beams, a transforming lens, one or more prisms, a diffraction grating (or other dispersive element), and a partially reflective output coupler. Embodiments of the invention may also include a telescope lens set (or "optical telescope") disposed between the diffraction grating and the output coupler. The emitters may include, consist essentially of, or consist of diode lasers, fiber lasers, fiber-pigtailed diode lasers, etc., and may be packaged individually or in groups as one- or two-dimensional arrays. In various embodiments, the emitter arrays are high-power diode bars with each bar having multiple (e.g., tens of) emitters. The emitter arrays may have micro-lenses attached thereto for emitter collimation and beam shaping. The transforming lens, normally confocal and positioned between the emitters and the grating, collimates individual beams from different emitters and converges all the chief rays of the beams to the center of the grating, particularly in the WBC dimension (i.e., the dimension, or direction, in which the beams are combined). The telescope lens set, which may be positioned downstream of the grating, may include, consist essentially of, or consist of two cylindrical lenses having power in the WBC dimension and may be used to generate proper output beam size and throw waists of the individual beams at or near the output coupler. (In various embodiments, the telescope lens set also has power in the non-WBC dimension.) The partially reflective output coupler is typically a flat partial reflector, which provides feedback to individual emitters and defines wavelengths of individual emitters via the grating. That is, the coupler reflects a portion of the various beams back to their individual emitters, thereby forming external lasing cavities, and transmits the combined multi-wavelength beam for usages such as welding, cutting, machining, processing, etc. and/or for coupling into one or more optical fibers.

As known in the art, a WBC resonator has maximum efficiency of feedback when the waists of individual beams all fall at the surface providing feedback. It is also understood that the beam quality of the output beam of a WBC resonator is typically largely dependent on the identicalness of individual beams overlapped on and after (i.e., optically downstream of) the grating. Since the telescope lens set, which throws the waists of individual beams on the coupler, is shared by all the beams, the identicalness of individual beams before entering the telescope lens set may be important for achieving efficient and uniform feedback and the high beam quality. In accordance with embodiments of the present invention, one or more prisms are utilized for minimizing the differences of the beams for achieving high beam quality and laser performance. One or more (or even all) of the prisms may be optical components separate and discrete from, and spaced apart from, the diffraction grating. In various embodiments, one of the prisms may be in contact with, or even part of an integrated component with, the diffraction grating; such embodiments may also feature one or more prisms optically upstream and/or downstream of the prism/grating and which are physically separate and discrete (and spaced apart) therefrom.

In various embodiments, the usage of wavelength bandwidth of the WBC resonator is reduced by using one or more prisms. Specifically, one or more prisms (e.g., an anamorphic prism pair) may be utilized for beam size expansion. Since the beam divergence is inversely proportional to the beam size of a collimated laser beam, a properly positioned prism before (i.e., optically upstream of) the grating may expand beam size and reduce the cone angle of the chief rays of the beams incident on the grating and therefore provide a narrower wavelength bandwidth.

In various embodiments, the WBC resonator is also more compact and robust via the use of the one or more prisms, which may provide a supporting or mounting base for a normally fragile transmission grating. Although diffraction gratings are utilized herein as exemplary dispersive elements, embodiments of the invention may utilize other dispersive elements such as, for example, dispersive prisms, transmission gratings, or Echelle gratings.

Embodiments of the present invention couple multi-wavelength output beams into an optical fiber. In various embodiments, the optical fiber has multiple cladding layers surrounding a single core, multiple discrete core regions (or "cores") within a single cladding layer, or multiple cores surrounded by multiple cladding layers. In various embodiments, the output beams may be delivered to a workpiece for applications such as cutting, welding, etc.

Herein, "optical elements" may refer to any of lenses, mirrors, prisms, gratings, and the like, which redirect, reflect, bend, or in any other manner optically manipulate electromagnetic radiation. Herein, beam emitters, emitters, or laser emitters, or lasers include any electromagnetic beam-generating device such as semiconductor elements, which generate an electromagnetic beam, but may or may not be self-resonating. These also include fiber lasers, disk lasers, non-solid state lasers, vertical cavity surface emitting lasers (VCSELs), etc. Generally, each emitter includes a back reflective surface, at least one optical gain medium, and a front reflective surface. The optical gain medium increases the gain of electromagnetic radiation that is not limited to any particular portion of the electromagnetic spectrum, but that may be visible, infrared, and/or ultraviolet light. An emitter may include or consist essentially of multiple beam emitters such as a diode bar configured to emit multiple beams.

Laser diode arrays, bars and/or stacks, such as those described in the following general description may be used in association with embodiments of the innovations described herein. Laser diodes may be packaged individually or in groups, generally in one-dimensional rows/arrays (diode bars) or two dimensional arrays (diode-bar stacks). A diode array stack is generally a vertical stack of diode bars. Laser diode bars or arrays generally achieve substantially higher power, and cost effectiveness than an equivalent single broad area diode. High-power diode bars generally contain an array of broad-area emitters, generating tens of watts with relatively poor beam quality; despite the higher power, the brightness is often lower than that of a broad area laser diode. High-power diode bars may be stacked to produce high-power stacked diode bars for generation of extremely high powers of hundreds or thousands of watts. Laser diode arrays may be configured to emit a beam into free space or into a fiber. Fiber-coupled diode-laser arrays may be conveniently used as a pumping source for fiber lasers and fiber amplifiers.

A diode-laser bar is a type of semiconductor laser containing a one-dimensional array of broad-area emitters or alternatively containing sub arrays containing, e.g., 10-20 narrow stripe emitters. A broad-area diode bar typically contains, for example, 19-49 emitters, each having dimensions on the order of, e.g., 1 µm×100 µm. The beam quality along the 1 µm dimension or fast-axis is typically diffraction-limited. The beam quality along the 100 µm dimension or slow-axis or array dimension is typically many times diffraction-limited. Typically, a diode bar for commercial applications has a laser resonator length of the order of 1 to 4 mm, is about 10 mm wide and generates tens of watts of output power. Most diode bars operate in the wavelength region from 780 to 1070 nm, with the wavelengths of 808 nm (for pumping neodymium lasers) and 940 nm (for pumping Yb:YAG) being most prominent. The wavelength range of 915-976 nm is used for pumping erbium-doped or ytterbium-doped high-power fiber lasers and amplifiers.

A diode stack is simply an arrangement of multiple diode bars that can deliver very high output power. Also called diode laser stack, multi-bar module, or two-dimensional laser array, the most common diode stack arrangement is that of a vertical stack which is effectively a two-dimensional array of edge emitters. Such a stack may be fabricated by attaching diode bars to thin heat sinks and stacking these assemblies so as to obtain a periodic array of diode bars and heat sinks. There are also horizontal diode stacks, and two-dimensional stacks. For the high beam quality, the diode bars generally should be as close to each other as possible. On the other hand, efficient cooling requires some minimum thickness of the heat sinks mounted between the bars. This tradeoff of diode bar spacing results in beam quality of a diode stack in the vertical direction (and subsequently its brightness) is much lower than that of a single diode bar. There are, however, several techniques for significantly mitigating this problem, e.g., by spatial interleaving of the outputs of different diode stacks, by polarization coupling, or by wavelength multiplexing. Various types of high-power beam shapers and related devices have been developed for such purposes. Diode stacks may provide extremely high output powers (e.g. hundreds or thousands of watts).

In an aspect, embodiments of the invention feature a wavelength beam combining laser system that includes, consists essentially of, or consists of one or more beam emitters emitting a plurality of discrete beams, focusing optics, a diffraction grating (or other dispersive element), a partially reflective output coupler, and one or more first prisms. The focusing optics focus the plurality of beams toward the diffraction grating. The diffraction grating receives and disperses the focused beams. The focal plane of the beams defined by the focusing optics is angled (i.e., at a non-zero angle) or otherwise non-coplanar with respect to the plane defined by the diffraction grating. For example, the diffraction grating may be substantially planar, and thus the plane defined by the diffraction grating corresponds to the plane of the diffraction grating itself. The partially reflective output coupler receives the dispersed beams, transmits a portion of the dispersed beams therethrough as a multi-wavelength output beam, and reflects a second portion of the dispersed beams back toward the beam emitter. The one or more first prisms are disposed optically downstream of the focusing optics and optically upstream of the diffraction grating. The one or more first prisms (i) receive the beams on an entrance surface of one of the first prisms at an angle of incidence and (ii) transmit the beams from an exit surface of one of the first prisms to the diffraction grating at an exit angle smaller than the angle of incidence, whereby (a) the resulting focal plane of the beams is rotated to be substantially coplanar with the plane defined by the diffraction grating and (b) the sizes of the beams incident on the diffraction grating are substantially equal to each other.

Embodiments of the invention may include one or more of the following in any of a variety of combinations. The one or more first prisms may include, consist essentially of, or consist of a single first prism having the entrance surface and the exit surface. The one or more first prisms may include, consist essentially of, or consist of a plurality of first prisms. The entrance and exit surfaces may be on different first prisms. The diffraction grating may be disposed on and in contact with the exit surface. The diffraction grating and a first prism may be a single integrated component. The diffraction grating may be substantially coincident with the exit surface. The diffraction grating may be reflective, whereby the diffracted beams from the diffraction grating are transmitted through at least one of the first prisms before being received by the output coupler. The diffraction grating may be transmissive.

The laser system may include one or more second prisms disposed optically downstream of the diffraction grating and optically upstream of the output coupler. Diffracted (i.e. wavelength-dispersed) beams from the diffraction grating may be received by an entrance surface of a second prism at a second angle of incidence and transmitted from an exit surface of a second prism at a second exit angle larger than the second angle of incidence, whereby beam-size expansion introduced by the one or more first prisms is reduced or substantially eliminated. The one or more second prisms may include, consist essentially of, or consist of a single second prism having the entrance surface and the exit surface. The one or more second prisms may include, consist essentially of, or consist of a plurality of second prisms. The entrance and exit surfaces may be on different second prisms. The laser system may include an optical telescope disposed between the diffraction grating and the output coupler. The optical telescope may throw the waists of the diffracted beams proximate or substantially on the output coupler. The optical telescope may include, consist essentially of, or consist of two cylindrical lenses having optical power in a wavelength beam combining dimension.

In another aspect, embodiments of the invention feature a method of wavelength beam combining a plurality of beams having different wavelengths. The plurality of beams is focused toward a diffraction grating. The focal plane of the beams is angled with respect to a plane defined by the diffraction grating. The focal plane of the beams is rotated and/or translated such that the focal plane is substantially coplanar with the plane defined by the diffraction grating. The beams are wavelength-dispersed with the diffraction grating. A first portion of the dispersed beams is reflected back toward the diffraction grating. A second portion of the dispersed beams is transmitted as a multi-wavelength output beam.

Embodiments of the invention may include one or more of the following in any of a variety of combinations. The multi-wavelength output beam may have all of the wavelengths of the plurality of beams. The focal plane of the beams may be rotated by one or more first prisms. The one or more first prisms may be disposed optically upstream of the diffraction grating. Rotating the focal plane of the beams may expand a size of at least one of the beams. The beam-size expansion may be reduced or substantially eliminated after the beams have been wavelength-dispersed. The beam-size expansion may be reduced or substantially eliminated by one or more second prisms. The one or more second prisms may be disposed optically downstream of the diffraction grating. Wavelength-dispersing the beams may include, consist essentially of, or consist of transmitting the beams through the diffraction grating. Wavelength-dispersing the beams may include, consist essentially of, or consist of reflecting the beams with the diffraction grating.

In yet another aspect, embodiments of the invention feature a wavelength beam combining laser system that includes, consists essentially of, or consists of one or more beam emitters emitting a plurality of discrete beams, focusing optics, a diffraction grating (or other dispersive element), a partially reflective output coupler, and a first prism. The focusing optics focus the plurality of beams toward the diffraction grating and define a focal plane of the beams. The diffraction grating receives and disperses the focused beams. The focal plane of the beams defined by the focusing optics may be angled (i.e., at a non-zero angle) or otherwise non-coplanar with respect to the plane defined by the diffraction grating. For example, the diffraction grating may be substantially planar, and thus the plane defined by the diffraction grating corresponds to the plane of the diffraction grating itself. In various embodiments, the focal plane of the beams defined by the focusing optics is substantially coplanar with the plane defined by the diffraction grating. The partially reflective output coupler receives the dispersed beams, transmits a portion of the dispersed beams therethrough as a multi-wavelength output beam, and reflects a second portion of the dispersed beams back toward the beam emitter. The first prism is disposed optically downstream of the focusing optics and optically upstream of the diffraction grating. The first prism (i) receives the beams on an entrance surface of the first prism at an angle of incidence and (ii) transmits the beams from an exit surface of the first prism to the diffraction grating at an exit angle, whereby the resulting focal plane of the beams is substantially coplanar with the plane defined by the diffraction grating. The sizes of the beams incident on the diffraction grating may be substantially equal to each other or may be different from each other. The angle of incidence may be less than, approximately equal to, or greater than the exit angle.

Embodiments of the invention may include one or more of the following in any of a variety of combinations. The diffraction grating may be disposed on and in contact with the exit surface. The diffraction grating and the first prism may be a single integrated component. The diffraction grating may be substantially coincident with the exit surface. The diffraction grating may be reflective, whereby the diffracted beams from the diffraction grating are transmitted through the first prism before being received by the output coupler. The diffraction grating may be transmissive.

The laser system may include one or more second prisms disposed optically downstream of the diffraction grating and optically upstream of the output coupler. Diffracted (i.e. wavelength-dispersed) beams from the diffraction grating may be received by an entrance surface of a second prism at a second angle of incidence and transmitted from an exit surface of a second prism at a second exit angle larger than the second angle of incidence, whereby a size of at least one of the beams is decreased. The one or more second prisms may include, consist essentially of, or consist of a single second prism having the entrance surface and the exit surface. The one or more second prisms may include, consist essentially of, or consist of a plurality of second prisms. The entrance and exit surfaces may be on different second prisms. The laser system may include an optical telescope disposed between the diffraction grating and the output coupler. The optical telescope may throw the waists of the diffracted beams proximate or substantially on the output coupler. The optical telescope may include, consist essentially of, or consist of two cylindrical lenses having optical power in a wavelength beam combining dimension. The laser system may include one or more second prisms disposed optically downstream of the focusing optics and optically upstream of the first prism.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "substantially" and "approximately" mean±10%, and in some embodiments, ±5%. The term "consists essentially of" means excluding other materials that contribute to function, unless otherwise defined herein. Nonetheless, such other materials may be present, collectively or individually, in trace amounts. Herein, the terms "radiation" and "light" are utilized interchangeably unless otherwise indicated. Herein, "downstream" or "optically downstream," is utilized to indicate the relative placement of a second element that a light beam strikes after encountering a first element, the first element being "upstream," or "optically upstream" of the second element. Herein, "optical distance" between two components is the distance between two components that is actually traveled by light beams; the optical distance may be, but is not necessarily, equal to the physical distance between two components due to, e.g., reflections from mirrors or other changes in propagation direction experienced by the light traveling from one of the components to the other.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 1A is an enlarged portion of FIG. 1;

FIG. 2A is an enlarged portion of FIG. 2;

FIG. 3A is an enlarged portion of FIG. 3;

DETAILED DESCRIPTION

Figure 1:
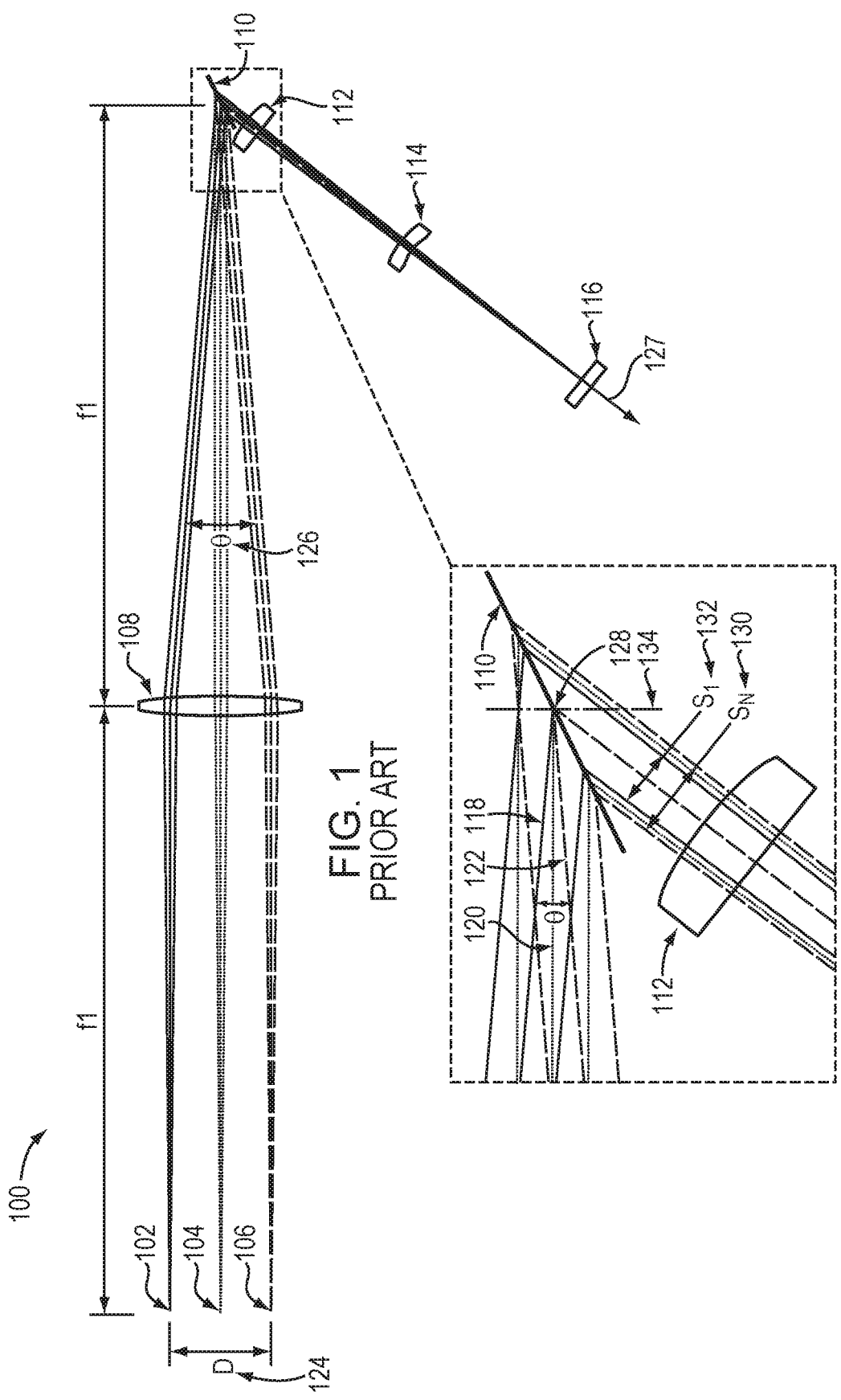
FIG. 1 is a schematic diagram of a partial WBC resonator in the WBC dimension illustrating beam size differences on and after a diffraction grating caused by different angles of beam incidence.

FIG. 1 shows a typical conventional layout of a wavelength beam combining (WBC) resonator 100 in the WBC dimension. The resonator 100 features multiple emitters 102, 104, 106, a transforming lens 108 having a focal length f1, a diffraction grating 110, a telescope lens set featuring lenses 112, 114, and a partially reflective output coupler 116. Although not shown in FIG. 1 and the other figures, the emitters may have microlenses attached thereto for reducing initial large divergence and for beam shaping and orientation. The transforming lens 108 is normally positioned confocal to emitters and the grating 110. The lens 108 collimates individual emitters and converges emitter chief rays to the center of the grating 110, especially in the WBC dimension. The chief rays of the emitters 102, 104, 106 are labeled as 118, 120, and 122, respectively. As shown in FIG. 1, emitters 102, 104, 106 form the source array for the WBC resonator 100 with a dimension of D (124) on the WBC plane. For a given WBC resonator, the source dimension D (124) defines the cone angle θ (126) of the chief ray incidence on the grating 110 and therefore, the wavelength bandwidth of the resonator.

Lens 112 and lens 114 form a telescope lens set designed for beam size reduction, particularly in the WBC dimension, and also for throwing waists of individual beams onto output coupler 116. The coupler 116, typically a partial reflector, provides feedback to individual emitters via the grating 110 and also transmits the combined multi-wavelength output beam 127. For high beam quality, particularly in the WBC dimension, a WBC resonator is typically designed to have all of the chief rays overlapped at the center of the grating. As shown in FIG. 1, the ideal overlap of the chief rays at the center 128 of the grating 110 will result in a perfect collinear overlap of all the chief rays after the grating 110. However, the overlap of individual beams after the grating 110 is actually incomplete because of differences in the beam sizes of individual beams, which are caused by the differences of incident angles on the normally tilted grating 110. Such incomplete overlap of the beams will degrade the beam quality of the output beam of the WBC resonator approximately by a factor of $S_N/S_1$, where $S_N$ (130) is the beam size of the beam from emitter 106, which has the largest incidence angle to the grating 110, and $S_1$ (132) is the beam size of the beam from emitter 102, which has the smallest incidence angle to the grating.

The difference sizes of beams optically downstream of the grating will not only degrade the output beam quality, but also reduce the feedback uniformity between emitters and the overall feedback efficiency because the shared telescope lens set 112, 114 may only be optimized for a particular input emitter beam. Other beams may therefore suffer large feedback losses because their waists may be located far away from the coupler 116.

Beam size differences optically downstream of the grating may also be explained by the discrepancy of the focal plane 134, which is normal to the center chief ray 120, and the orientation of the grating 110, which is normally designed to be tilted at a large angle relative to the center chief ray 120 for achieving needed dispersion power and diffraction efficiency. As shown, the focal plane 134 may be rotated (i.e., at a non-zero angle) or otherwise not coplanar with respect to the grating 110. If the focal plane 134 may be tilted so that it lies along the grating 110, the beam size differences after the grating 100 may be eliminated or minimized.

Table 1 and Table 2 below demonstrate a numerical example of a typical conventional WBC resonator described above, and thus provide a reference for comparison for the embodiments of the present invention depicted hereinafter.

TABLE 1

Design parameters of an example WBC resonator 100

| | |
|---|---|
| Source dimension D | 50 mm |
| Emitter divergence in WBC plane | 20 mrad |
| Lens 108 focal length (f1) | 300 mm |
| Grating line density | 1850/mm |
| Center emitter wavelength | 970 nm |

Grating configured at Littrow angle at center wavelength

TABLE 2

Calculated results of the resonator 100 defined by Table 1

| | |
|---|---|
| Path length (from emitters to coupler) | ~800 mm |
| Chief ray converging angle (θ) | 9.6 degrees |
| Beam size difference after grating ($S_N/S_1$) | 1.47 (47%) |
| Wavelength bandwidth (emitter 102 to emitter 106) | 40 nm |

Table 2 shows the results of the WBC resonator based on the parameters defined by Table 1. The resonator has total path length about 800 mm, including ~600 mm upstream of the grating 110, which is about twice the focal length f1, and ~200 mm downstream of the grating 110, a distance utilized for proper output beam size and waist location. For a given transforming lens 108 and grating 110, the source dimension D (124) sets the incident cone angle θ (126) and thus the wavelength bandwidth of the resonator.

The large beam size difference (47%) shown in Table 2 implies that the output beam quality may be worse by a factor of about 1.47 than that of a single emitter (assuming every emitter has the same beam quality). The large beam size difference will also tend to cause large difference of waist locations and therefore greatly reduce feedback uniformity and overall feedback efficiency. Thus, reducing the beam size difference of the beams will not only improve output beam quality, but also the laser performance.

The wavelength bandwidth shown in Table 2 shows that the operating wavelength of the edge emitter on one end will be different by 40 nm from the edge emitter at the other end, i.e., the emitters 102 and 106 in FIG. 1. Assuming the source emitters are diode lasers, since diode lasers at 970 nm-band have a gain range of about 30 nm, the source emitter array of this WBC resonator would need at least two different bands of diode lasers to cover the whole bandwidth. More importantly, since diode lasers may shift wavelength at a rate of about 0.35 nm/° C., the number of bands required to make this WBC laser operate at both low current (low temperature) and high current (high temperature) may be actually much greater than two. More bands mean more chip designs and more work on binning and screening and therefore result in higher cost for the laser system. In addition, as understood to one skilled in the art, wide wavelength range may also add extra power losses from coating surfaces and extra costs for the coatings.

Figure 2:
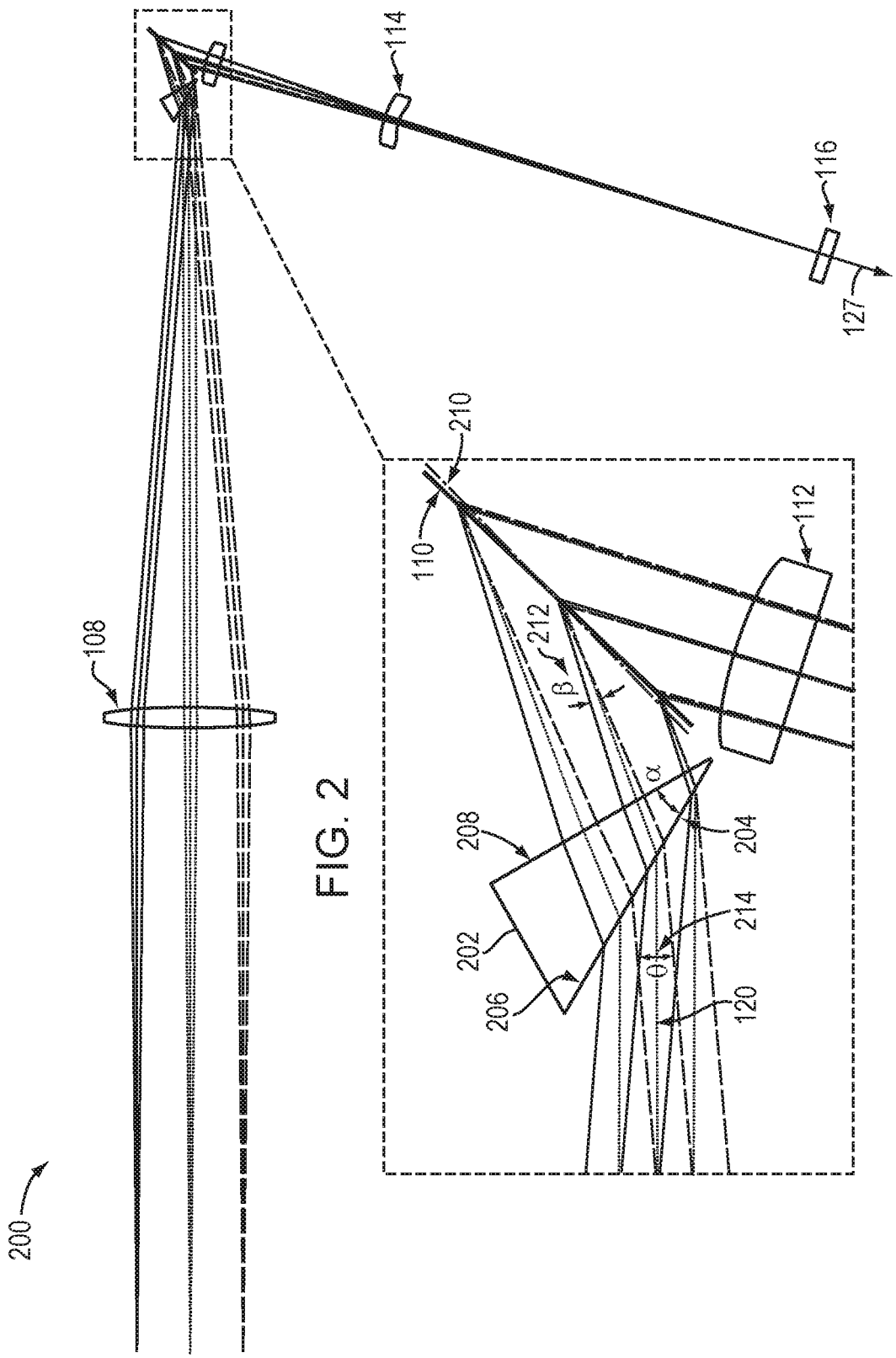
FIG. 2 is a schematic diagram of a partial WBC resonator in accordance with embodiments of the present invention, illustrating reduced beam size differences on and after the grating.

Embodiments of the present invention address the issues mentioned above. FIG. 2 depicts a WBC resonator 200 in accordance with various embodiments of the invention. As shown, resonator 200 features within the beam path a prism 202 having a corner angle α (204), an entrance surface 206, and an exit surface 208. The angle between the entrance surface 206 and the exit surface 208 corresponds to the corner angle 204. In exemplary embodiments of the invention, the prism 202 is a right-angle prism having a corner 204 angle ranging from approximately 10° to approximately 45°, although embodiments of the invention also feature other prisms such as non-right-angle prisms. For a particular resonator 200, many factors, including center wavelength, grating incident angle, and prism refractive index, etc., may affect the selection of the prism corner angle 204 and the relative orientation of the prism 202. As shown in FIG. 2, the prism 202 lies on the WBC plane and is aligned with its corner angle 204 pointing toward the grating 110, forming a large incident angle and a small exiting angle for the center chief ray 120. As also shown, in various embodiments of the invention, the entrance surface 206 and/or the exit surface 208 (and even all surfaces of the prism 202) are not parallel to the plane of the grating 110.

In the resonator 200, the prism 202 has at least two effects. First, it introduces a linear phase retardation in the WBC dimension, which results a tilted focal plane 210 tilting toward the plane of the grating 110 so that the difference of projected beam sizes of individual beams on the grating 110 are minimized. This effect is very obvious when comparing to the layout of resonator 100 shown in FIG. 1. In various embodiments, the focal plane 210 is substantially coplanar with the plane of the grating 110, i.e., an angle between the focal plane 210 and the plane of the grating 110 is less than 2°, less than 1°, less than 0.5°, less than 0.2°, or even less than 0.1°. Second, because of the larger angle of incidence on the entrance surface 206 (i.e., the angle between the incoming beams and the surface normal of entrance surface 206) and the smaller exit angle from the exit surface 208 (i.e., the angle between the outgoing beams and the surface normal of the exit surface 208), the laser beams passing through the prism 202 may be expanded by a beam expansion factor F. Correspondingly, the chief ray converging angle β (212) optically downstream of the prism 202 may be reduced by the same factor F compared to the converging angle θ (214) optically upstream of the prism 202, i.e., F=θ/β>1. Therefore, the wavelength bandwidth of WBC resonator 200 is effectively narrowed by a factor of F compared to resonator 100. In accordance with various embodiments of the invention, the value of F may be up to 4 for a single prism and up to 16 with a prism pair. Thus, the effective dispersion power of a prism-grating combination may be several times larger than systems utilizing a grating alone. Note that the dramatic increase of dispersion power by using one or more prisms in a WBC resonator is not due to the natural dispersion power of the prism(s), which is virtually negligible compared to the grating used in such a resonator, but because of the effective beam size expansion after passing through the prism(s) (e.g., as in an anamorphic prism pair).

For comparison purposes, a numerical example of the WBC resonator 200 of FIG. 2 is provided in Table 3 based on the same design parameters included in Table 1 above.

TABLE 3

Calculated results of WBC resonator 200 with parameters as in Table 1

| | |
|---|---|
| Path length (from emitter to coupler) | >900 mm |
| Incoming chief ray converging angle (θ) | 9.6 degrees |
| chief ray converging-to-grating angle (β) | 6 degrees |
| Prism1 beam expansion factor (F) | 1.6 |
| Beam size difference after grating | ~1% |
| Wavelength bandwidth | 25 nm |

As shown in Table 3, by using the prism 202 in resonator 200, the beam size difference is dramatically reduced from 47% (see Table 2) down to about 1%. Models developed using ZEMAX optical modelling software have also revealed that, after inserting prism 202 into the resonator 200, it becomes possible to throw all the waists of individual beams to the coupler 116 within 5% of the Rayleigh range, compared to over 50% for resonator 100 lacking the prism 202. This is a strong indication that minimizing beam size differences by using one or more prisms will also greatly improve the feedback uniformity and efficiency. Table 3 also shows that the wavelength bandwidth is narrowed by a factor of 1.6, from 40 nm (see Table 2) to 25 nm, as expected due to the 1.6× beam expansion provided by prism 202.

In various embodiments, systems featuring one or more prisms (e.g., prism 202) may utilize a larger size grating 110 due to the increased beam size and the longer path length upstream of the grating 110. As shown in Table 3, the full path length is increased by >100 mm, and an added distance between lens 112 and coupler 116 may be utilized to keep the output unchanged.

Figure 3:
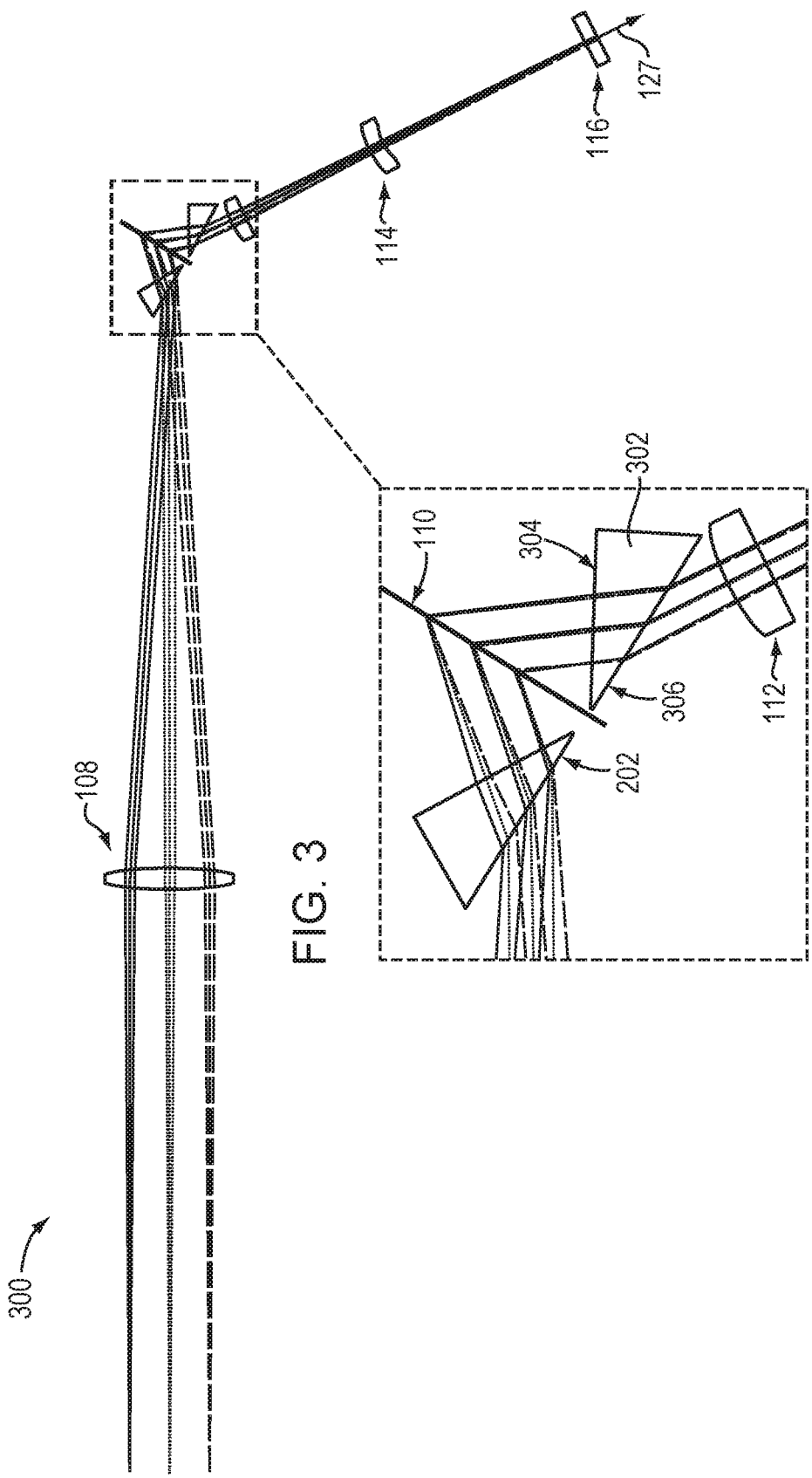
FIG. 3 is a schematic diagram of a partial WBC resonator incorporating multiple prisms in accordance with embodiments of the present invention, where a first prism upstream of the grating improves beam quality and reduces wavelength bandwidth and a second prism downstream of the grating reverses beam expansion.

FIG. 3 depicts a WBC resonator 300 in accordance with various embodiments of the present invention. As shown, resonator 300 features an additional prism 302 utilized to shrink the beam size, i.e., undo the beam expansion caused by prism 202, so that the overall resonator path length may remain unchanged or even shortened. As shown, prism 302 may be placed between the grating 110 and the lens 112, although the prism 302 may be positioned anywhere between grating 110 and the coupler 116. As shown, the prism 302 is arranged such that the angle of incidence on entrance surface 304 of prism 302 is smaller than the exit angle from the exit surface 306 of the prism 302, resulting in small beam size optically downstream of the prism 302. In exemplary embodiments of the invention, the prism 302 is a right-angle prism having a corner angle between entrance surface 304 and exit surface 306 ranging from approximately 10° to approximately 45°, although embodiments of the invention also feature other prisms such as non-right-angle prisms. In various embodiments, the corner angles of prisms 202, 302 are approximately the same. As shown in FIG. 3, in various embodiments of the invention, the entrance surface 304 and/or the exit surface 306 (or even all of the surfaces of prism 302) are not parallel to the plane of the grating 110.

Figure 4:
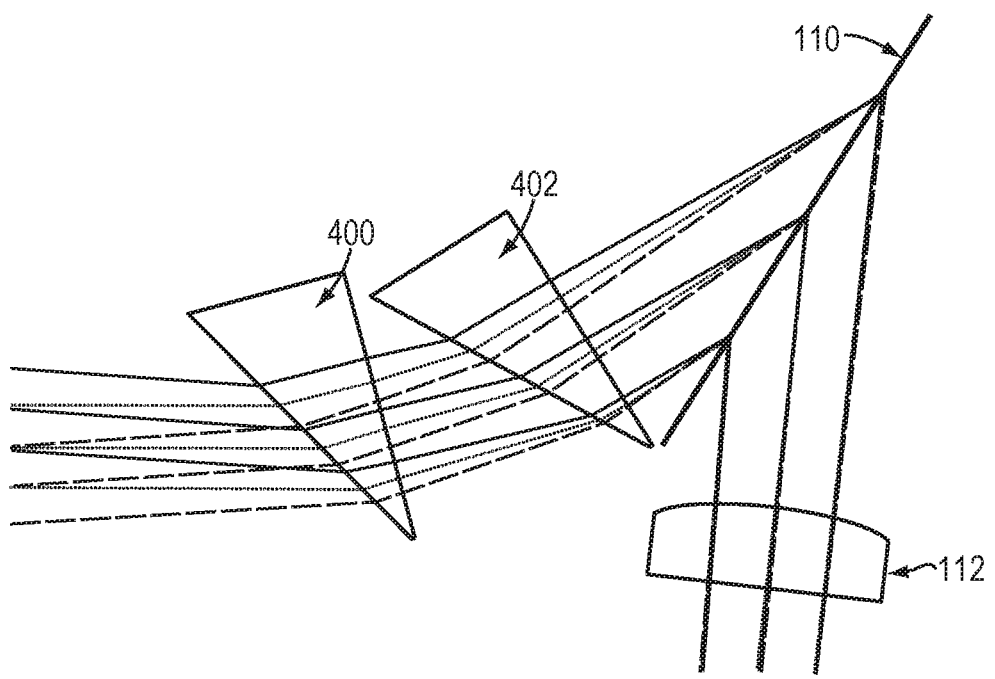
FIG. 4 is a schematic diagram of a partial WBC resonator incorporating multiple prisms upstream of a grating in accordance with embodiments of the present invention.

FIG. 4 depicts an embodiment of the present invention that replaces prism 202 of resonator 200 with a pair of prisms 400, 402 optically upstream of the grating 110. In the depicted embodiment, the prisms 400, 402 are arranged to place the focal plane of the beams substantially on the grating 110, as does prism 202 in resonator 200. As shown, prisms 400, 402 are arranged such that, for each prism, the angle of incidence on the entrance surface of the prism is smaller than the exit angle from the exit surface of the prism. Although FIG. 4 depicts two prisms 400, 402 replacing the prism 202 of resonator 200, embodiments of the invention include more than two prisms disposed optically upstream of the grating 110 and arranged to minimize beam-size differences optically downstream of the grating 110. In various embodiments of the invention, advantages of utilizing two or more prisms in such a manner include the introduction of steeper linear phase retardance, i.e., generating a further tilted focal plane, which may be utilized when the angle of incidence on the grating is extremely large. In addition, such embodiments help reduce the angles of incidence on the prisms themselves, which may be desirable for minimizing or reducing antireflection-coating reflection losses. Embodiments of the invention also include arrangements, similar to that of FIG. 4, in which multiple prisms replace and replicate the functionality of prism 302 in FIG. 3. As shown in FIG. 4, in various embodiments of the invention in which multiple prisms are disposed optically upstream and/or downstream of the grating 110, the entrance surfaces and/or exit surfaces (or even all surfaces) of at least one (or even all) of the prisms are not parallel to the plane of the grating 110.

Figure 5A:
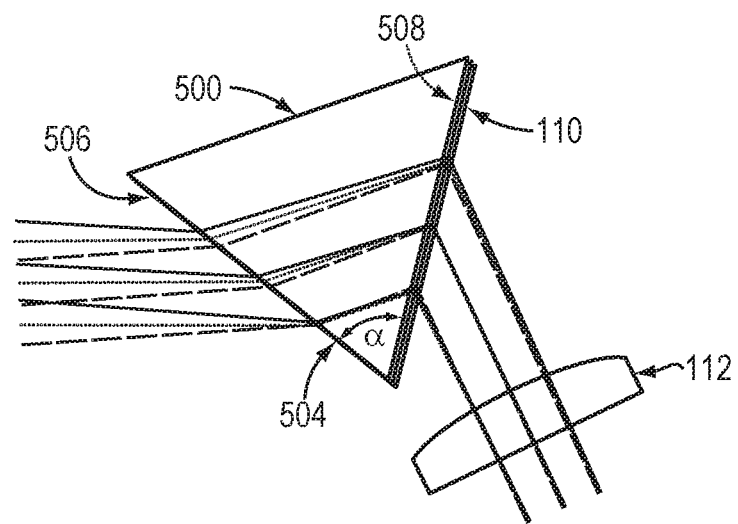
FIGS. 5A and 5B are schematic diagrams of partial WBC resonators incorporating prisms closely spaced in relation to or integrated with gratings in accordance with embodiments of the present invention.
Figure 5B:
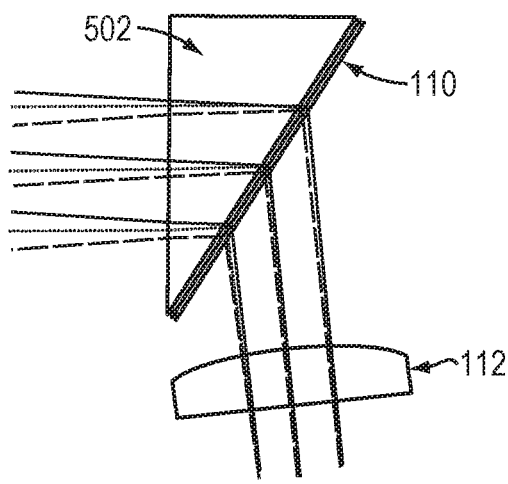

FIGS. 5A and 5B depict additional embodiments of the present invention in which prisms are utilized to minimize the difference in beam sizes on and optically downstream of the grating 110. As shown, the prisms 500, 502 also each provide a rigid support surface on which the grating 110 may be mounted and physically supported. Since the grating 110 is typically thin and fragile, resonators in which the grating 110 is mounted on and in contact with the prism may be both more compact and more robust. For example, an optical adhesive or other coupling agent may be utilized to mount the grating 110 on the exit surface of the prism. Embodiments of the present invention also encompass the use of single integrated optical components combining a prism with a diffraction grating on the exit surface thereof.

As shown in FIG. 5A, the prism 500 may be an isosceles triangular prism having corner angle α (504) between entrance surface 506 and exit surface 508 ranging from approximately 45° to approximately 75°. In such embodiments, the beam size downstream of the grating 100 may be approximately the same as the beam size upstream of the prism 500, and thus the wavelength bandwidth of the resonator may be substantially unchanged with or without the prism 500. That is, the incidence angle onto the prism 500 and the exit angle from the prism 500 may be substantially the same in various embodiments of the present invention. In contrast, the prism 502 depicted in FIG. 5B is similar to prism 202 and has a corner angle ranging from approximately 10° to approximately 45°. Since prism 502 is aligned such that its exit surface approximately corresponds to the focal point of the beams and to the surface of the grating 110, prism 502 will tend to shrink the beam size, and therefore the wavelength bandwidth of the resonator may be widened when utilizing prism 502. That is, in various embodiments the incidence angle onto the prism 502 may be smaller than the exit angle from the prism 502.

Figure 6:
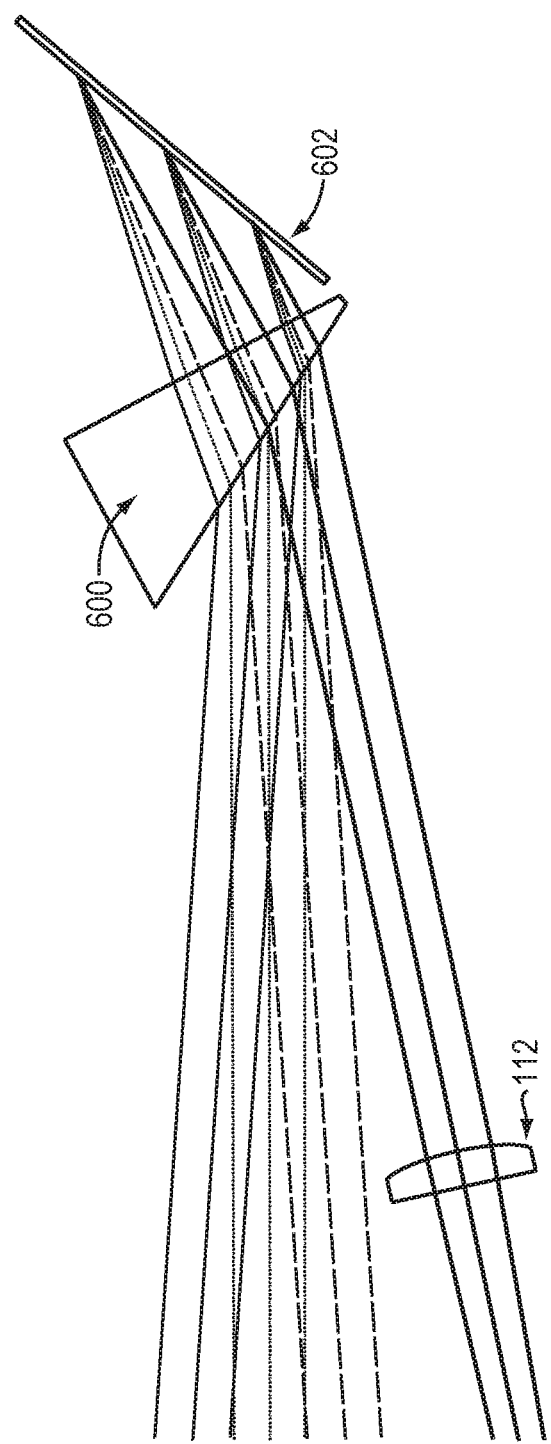
FIG. 6 is a schematic diagram of a partial WBC resonator featuring a prism and a reflective grating in accordance with embodiments of the present invention.

Embodiments of the present invention may utilize reflective diffraction gratings rather than transmissive gratings, as shown in FIG. 6. As shown, a single prism 600 transmits and focuses the beams toward a reflective grating 602 and receives and transmits the diffracted beams toward the lens 112 and thence to the coupler 116. Thus, when transmitting the beams toward the reflective grating 602, the prism 600 functions as prism 202 depicted in FIGS. 2 and 3, and when transmitting the diffracted beams received from the reflective grating 602, the prism 600 functions as prism 302 depicted in FIG. 3. As shown in FIG. 6, in various embodiments of the invention, one or more (or even all) of the surfaces of reflective grating 602 are not parallel to the plane of the grating 110.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A wavelength beam combining laser system comprising:
    one or more beam emitters configured to emit a plurality of discrete beams;
    a dispersive element for receiving the beams and dispersing the beams;
    disposed optically downstream of the beam emitters and optically upstream of the dispersive element, focusing optics for receiving the beams from the one or more beam emitters and focusing the beams such that chief rays of the emitters converge at the dispersive element;
    a first prism positioned to receive the beams from the focusing optics, the first prism having (i) an entrance surface at which the beams are received and (ii) an exit surface, wherein (a) the first prism is spaced apart from both the focusing optics and the dispersive element, and (b) an angle of incidence of the beams at the entrance surface is larger than an exit angle of the beams at the exit surface, whereby the beams are expanded by the first prism; and
    a partially reflective output coupler positioned to receive the dispersed beams, transmit a portion of the dispersed beams therethrough as a multi-wavelength output beam, and reflect a second portion of the dispersed beams back toward the dispersive element.

2. The laser system of claim 1, wherein the dispersive element defines a dispersion plane.

3. The laser system of claim 2, wherein the entrance surface of the first prism is not parallel to the dispersion plane.

4. The laser system of claim 2, wherein the exit surface of the first prism is not parallel to the dispersion plane.

5. The laser system of claim 2, wherein the beams have a focal plane, downstream of the first prism, that is substantially coplanar with the dispersion plane.

6. The laser system of claim 2, further comprising, disposed optically downstream of the dispersive element and optically upstream of the output coupler, a second prism having an entrance surface and an exit surface.

7. The laser system of claim 6, wherein the entrance surface of the second prism is not parallel to the dispersion plane.

8. The laser system of claim 6, wherein the exit surface of the second prism is not parallel to the dispersion plane.

9. The laser system of claim 6, wherein the beams are shrunk by the second prism.

10. The laser system of claim 1, wherein the dispersive element comprises a diffraction grating.

11. The laser system of claim 1, wherein the dispersive element is reflective.

12. The laser system of claim 1, wherein the dispersive element is transmissive.

13. The laser system of claim 1, further comprising an optical telescope disposed between the dispersive element and the output coupler.

14. The laser system of claim 13, wherein the optical telescope comprises two cylindrical lenses.

15. The laser system of claim 1, wherein an angle between the entrance surface of the first prism and the exit surface of the first prism ranges from approximately 10° to approximately 45°.

16. The laser system of claim 1, wherein an angle between the entrance surface of the first prism and the exit surface of the first prism ranges from approximately 45° to approximately 75°.

17. The laser system of claim 1, further comprising, disposed optically downstream of the first prism and optically upstream of the dispersive element, a second prism having an entrance surface and an exit surface, wherein the second prism is spaced apart from both the first prism and the dispersive element.

18. The laser system of claim 17, wherein the entrance surface of the second prism is not parallel to the dispersion plane.

19. The laser system of claim 17, wherein the exit surface of the second prism is not parallel to the dispersion plane.

20. The laser system of claim 17, wherein the beams are shrunk by the second prism.

* * * * *